United States Patent
Shuy et al.

(10) Patent No.: US 10,177,575 B2
(45) Date of Patent: Jan. 8, 2019

(54) MAXIMUM ENERGY UTILIZATION POINT TRACKING TECHNOLOGIES

(71) Applicant: LT LIGHTING (TAIWAN) CORP., Xiangshan Dist., Hsinchu (TW)

(72) Inventors: Geoffrey Wen-Tai Shuy, Taipei (TW); Hsin-Chen Lai, Taichung (TW); Chang-Horang Li, Hsinchu (TW)

(73) Assignee: LT LIGHTING (TAIWAN) CORP., Hsinchu (TW)

( * ) Notice: Subject to any disclaimer, the term of this patent is extended or adjusted under 35 U.S.C. 154(b) by 2 days.

(21) Appl. No.: 15/424,566

(22) Filed: Feb. 3, 2017

(65) Prior Publication Data

US 2017/0149250 A1    May 25, 2017

Related U.S. Application Data

(63) Continuation-in-part of application No. 14/880,101, filed on Oct. 9, 2015.

(51) Int. Cl.
| | |
|---|---|
| *H02J 7/34* | (2006.01) |
| *H02J 3/38* | (2006.01) |
| *H02S 40/38* | (2014.01) |
| *G05F 1/67* | (2006.01) |

(52) U.S. Cl.
CPC ............ *H02J 3/385* (2013.01); *G05F 1/67* (2013.01); *H02S 40/38* (2014.12); *H02J 7/34* (2013.01); *Y02E 10/58* (2013.01)

(58) Field of Classification Search
CPC ..................................... G05F 1/67; H02J 7/34
See application file for complete search history.

(56) References Cited

U.S. PATENT DOCUMENTS

| | | | |
|---|---|---|---|
| 2010/0219690 A1 | 9/2010 | Femia et al. | |
| 2011/0140649 A1* | 6/2011 | Choi | H01M 14/005 320/101 |
| 2011/0210613 A1* | 9/2011 | O'Brien | H02J 3/32 307/82 |
| 2013/0154570 A1* | 6/2013 | Nomura | H02J 3/32 320/128 |

(Continued)

OTHER PUBLICATIONS

Office Action dated Aug. 1, 2016 from U.S. Appl. No. 14/880,101.

(Continued)

*Primary Examiner* — Jared Fureman
*Assistant Examiner* — Emmanuel R Dominique
(74) *Attorney, Agent, or Firm* — Workman Nydegger

(57) ABSTRACT

When one operates an energy system at its maximum energy utilization point (MEUP) consistently, one can receive the most amount of energy benefit from the system. The practical MEUP tracking technologies operate a generator at a voltage for maximum power extraction and to produce near-maximum power; incorporate the invented surplus energy extraction devices to near-perfectly extract all power generated; temporarily store the surplus energy into designed energy reservoirs; add the invented supply devices to combined the energy from the extractor and from the reservoirs; prepare and deliver the right amount of power to exactly satisfy the instantaneous demand. Thus effectuates finding and tracking the MEUP of the energy system.

20 Claims, 7 Drawing Sheets

(56) References Cited

U.S. PATENT DOCUMENTS

2014/0268957 A1    9/2014  Khajehoddin et al.
2015/0103574 A1*   4/2015  Hintz .................... H02M 1/42
                                                    363/132

OTHER PUBLICATIONS

Office Action dated Dec. 15, 2016 from U.S. Appl. No. 14/880,101.
PCT/US2016/056299, Notification of Transmittal of the International Search Report and the Written Opinion of the International Searching Authority, or Declaration dated Dec. 22, 2016. (9 pages).

* cited by examiner

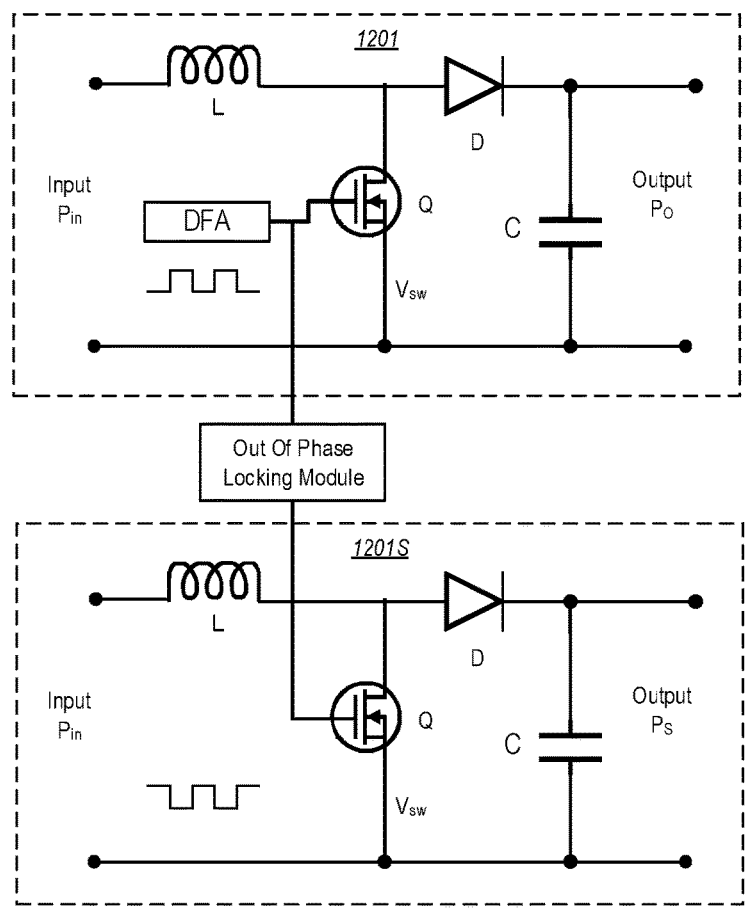
*Figure 8A*
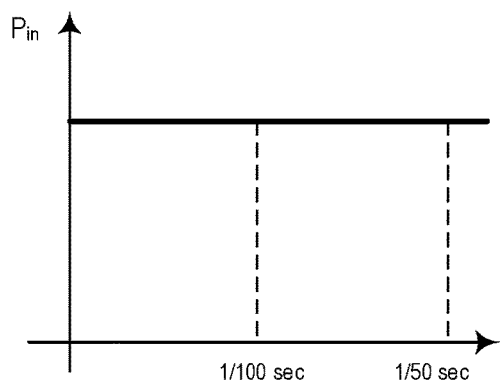
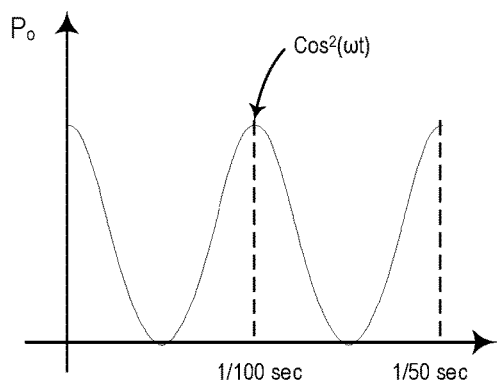
*Figure 8B*  *Figure 8C*

MAXIMUM ENERGY UTILIZATION POINT TRACKING TECHNOLOGIES

CROSS-REFERENCE TO RELATED APPLICATIONS

This patent application is a continuation-in-part of U.S. patent application Ser. No. 14/880,101, filed Oct. 9, 2015, which patent application is incorporated herein by reference in its entirety.

BACKGROUND

Many "green energy" electric generators utilize natural renewable energy sources that are characterized as having time varying intensity. Examples of such renewable energy sources include solar power, wind, tide, and wave motion. Most of such power generators incorporate a device named the "maximum power point tracker (MPPT)" to track the instantaneous maximum power production point (MPPP) voltage. The MPPT device typically is firmware and keeps track of the time varying voltage resulting in the maximum power production from a primary energy source having time varying intensity.

Typically, a commercial green energy system integrator applies the MPPP voltage to regulate the entire system operation including energy generation, the energy extraction, energy preparation, and energy delivery to a load. In other words, commercial green energy systems force the entire system to always operate at a generator's MPPP voltage derived from the MPPT firmware. This practice is hereinafter referred as "blind MPPT conformation".

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The inventors have discovered that the blind MPPT practice is suboptimal for a number of reasons. First, the blind MPPT practice does not match the characteristics of the energy extraction device to effectively and efficiently exact the produced energy. Second, the blind MPPT practice does not match the device to prepare and/or deliver the extracted energy for efficiently energy utilization. Third, the energy utilization efficiency is not only inextricably dependent on power production but is also dependent on power demand. Fourth, typical power consumption in any energy system is not equal to power production, even complying with the energy conservation law.

The practice of blind MPPT conformation can lead commercial "green energy system" designers fail to experimentally determine the devices' effectiveness and efficiencies— such as the effectiveness and efficiency of energy extraction from the generator, and such as the effectiveness and efficiency of energy that is prepared and then delivered to the load. In accordance with the principles described herein, the controller efficiency of a system is targeted to be the same as its "energy utilization efficiency". In this description and in the claims, the instantaneous "energy utilization efficiency" is defined as the instantaneous energy consumed by the load divided by the instantaneous energy generated by the generator. In a preferred embodiment, this instantaneous value is measured in a condition that holds the primary power input and the load steady for a long enough period of time such that the values of the power generated, the energy consumption, and their ratio all reach steady state.

Without indicating how the relevant efficiency was experimentally measured, commercial "green energy systems" typically proclaim greater than 90% efficiency for their system's "controller". However, the inventors' experimental measurements of many commercial systems reveal that the efficiency of energy extraction from the generator, and that of preparing and then delivering of the energy to the load can be very poor when regulating the system operation to blindly conform to the MPPP voltage. A typical controller that practices blind MPPT conformance practice can have efficiencies typically below 30% even when such efficiencies are advertised to be high.

In lieu of tracking the maximum power production point (MPPP), the principles described herein proposes to track the maximum energy utilization point (MEUP). When one consistently operates an energy system at its MEUP, one can receive the most amount of energy benefit from the energy system.

The inventors performed thorough investigations on energy systems by measuring efficiencies of every stage— from energy generation, to energy extraction, to energy preparation, to energy delivery, and to energy consumption; and thereby revealed problems to be addressed. The inventors developed ways of improving the efficiency at each stage; decoupled the energy production/extraction and energy supply; and optimized these processes separately. This resulted in a practical way of finding and tracking the maximum energy utilization point.

The MEUP tracking technologies operate the generator at near-maximum power production, incorporate the invented energy extraction devices to effectively extract all the maximum power generated, temporarily store the surplus energy into designed energy reservoirs, add the invented devices to combine the energy from the extractor and from the reservoir, and deliver the right amount of power to nearly exactly satisfy the load demand.

In doing so, the principles described herein results in a practical optimization of maximum energy utilization solution for energy systems. Such is especially true for green energy systems, which convert electricity from renewable energy sources (such as the solar power, wind, tide, or wave motion) that have the characteristics of time varying intensity; thereby effectuating the maximum energy utilization point tracking (MEPT).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 7A is a circuit diagram of a DC/DC converter;

FIG. 7B illustrates the input power (which is typically a DC power) as function of time, and shows a straight line in a time period of 1/50 seconds;

FIG. 7C illustrates the output power as function of time when the duty factor adjuster (DFA) (shown in FIG. 7A) is regulated by the synchronize regulator in the DC/AC inverter (not shown) connecting to a 50 Hz power grid, which is a pulsating DC of $p0*\cos 2(\omega t)$ form;

FIGS. 8A, 8B, 8C, and 8D illustrate a proposed surplus power extractor interacting with the power extractor in accordance with the principles described herein;

FIG. 8A is a circuit diagram of a surplus power extractor (lower part) interacting with the power extractor (upper part) through an out of phase locker (middle part);

FIG. 8B illustrates the input power as function of time, which is DC power (a straight line p0) in the time period shown (1/50 second);

FIG. 8C illustrates the power extractor's output power as function of time (which is $p0*\cos 2(\omega t)$) when the duty factor adjuster of the DC/DC convertor (shown in FIG. 7A) is regulated by the synchronize regulator (not shown) of the DC/AC inverter (shown in FIG. 6) connecting to a 50 Hz power grid; and FIG. 8D illustrates the surplus power extractor's output power as function of time (which is $p0*\sin 2(\omega t)$) when interacting with the power extractor producing power output of FIG. 8C.

DETAILED DESCRIPTION

Section One: Review on Energy System

Figure 1A:
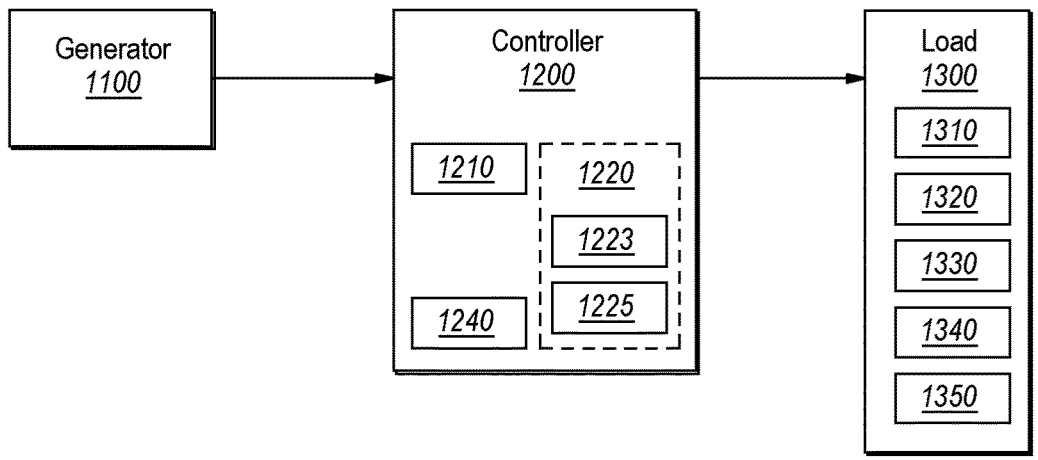
FIG. 1A symbolically illustrates a block diagram of a conventional energy system.
Figure 1B:
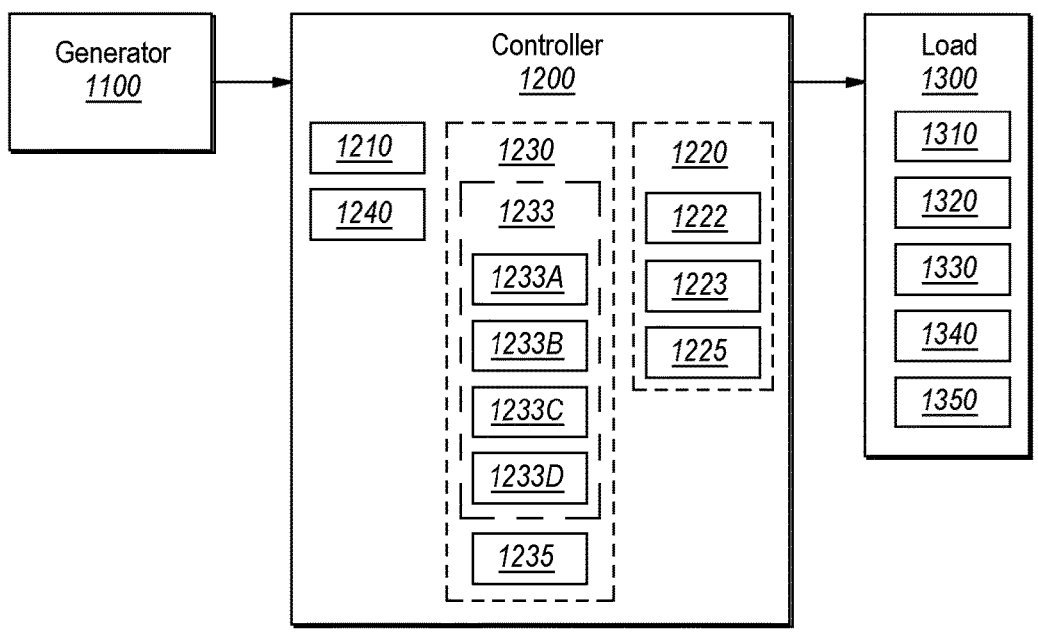
FIG. 1B symbolically illustrates a block diagram of an energy system in accordance with the principles described herein.
Figure 1C:
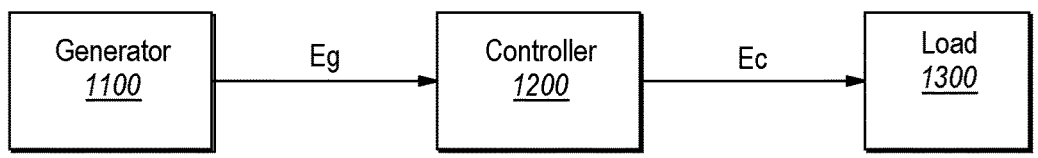
FIG. 1C symbolically illustrates a block diagram of general components of an energy system.

An energy system 1000 consists of generator(s) 1100, regulator(s) 1200, load(s) 1300; and all their module(s) thereof, which are described hereinafter and are depicted in FIGS. 1A, 1B and 1C. FIG. 1A depicts a conventional energy system block diagram; while FIG. 1B depicts a block diagram structure of an energy system in accordance with the principles described herein. The efficiency of any given subsystem is defined herein as the output of the given subsystem divided by the output of the previous subsystem. As a typical example, the regulator (or controller) efficiency is defined as the energy delivered to the load (Ec) divided by the energy produced by the generator (Eg) as depicted in FIG. 1C. The names of the modules depicted in FIG. 1 are listed as follows:

1000: Energy system,
1100: Generator,
1200: Controller or regulator,
1210: Conventional energy extraction device,
1220: Module or device,
1222: Energy preparation module,
1223: Power preparation regulator,
1225: Power delivery regulator,
1230: Surplus regulator,
1233: Surplus extract/utilize device,
1233A: Active surplus extractor,
1233B: Passive surplus extractor,
1233C: 1233C: Supply regulator,
1233D: Energy adjustment regulator,
1235: Energy reservoir,
1240: MPPT,
1300: Load,
1310: Lamps,
1320: Pumps,
1330: Office equipment,
1340: Appliance, and
1350: Air-conditioner.

As depicted in FIGS. 1A and 1B, an energy system 1000 comprises (1) at least one electric generator 1100 to convert primary energy into electric power; (2) a controller subsystem 1200 (also named as "energy management subsystem" or "regulator"), and (3) the load 130.

The controller subsystem 1200 regulates management functions of the entire energy system using modules (from 1210 to 1240) of the controller subsystem 1200. These management functions include the regulation of power generation 1100, the conventional energy extraction (performed by the conventional energy extraction device 1210), the preparation of energy (performed by the module 1223 of the module 1220), the delivery of energy to the load (performed by the module 1225 of the module 1220), and other critical functions described later. The controller subsystem 1200 may also include other functional modules such as the MPPT 1240.

The load 1300 consist of one or a combination of various equipment (e.g., resistive and/or inductive equipment) that utilize the produced electricity. For instance, such equipment may include (a) lamp(s), 1310; (b) water-pump(s), 1320; (c) office equipment 1330 (such as cash-register(s), typewriter(s), and computer(s), and so forth); (d) appliance(s) 1340 (such as refrigerator(s), fan(s), toaster(s)); and (e) air-conditioner(s) 1350. To reiterate, an energy system 1000 consists of generator(s) 1100, regulator(s) 1200, load(s) 1300; and all their constituent module(s).

An electric generator is a device that converts energy from a primary energy source (such as coal, oil, nature gas, nuclear, and so forth) into electricity. A "green" power generator utilizes renewable nature energy (such as solar-rays, wind, tide, or wave motion) as the primary energy sources to produce electricity. These primary energy sources typically have energy intensity that vary significantly with time; and result in a time varying maximum power production point (MPPP) voltage. Commercial green energy systems typically incorporate a MPPT 1240 (as a module in the subsystem 1200) to track the MPPP voltage.

The standard efficiency of the energy generator is defined as the value of its maximum electric power production (under a standard primary power input) divided by the primary power input. However using primary sources of time varying power, the efficiency of the generator consistently varies in time, resulting in an ever changing instantaneous efficiency value. The instantaneous efficiency value is defined as the instantaneous maximum power production (under the instantaneous primary power input) divided by corresponding instantaneous primary power input.

As depicted in the FIG. 1A, the controller (also called herein the "subsystem of energy management", or the "regulator") 1200 comprises device 1210 to extract energy produced in the generator 1100. The controller 1200 also comprises device 1220 to prepare (module 1222) and to condition (module 1223) the electricity and to deliver (module 1225) the power to the loads 1300. The module 1223 is thus named as the "power conditioning regulator"; and the module 1225 is thus named as the "power delivery regulator" herein.

Several skills in the art can be employed in energy extraction, in energy preparation, in energy conditioning, and in energy delivery. This disclosure chose one example in a solar power generation string to illustrate and clarify the terms energy extraction (or energy extractor), energy preparation, energy conditioning, and energy delivery herein. The term energy and power are interchangeable in the art and thus are interchangeable herein, unless indicated otherwise herein.

Figure 6:
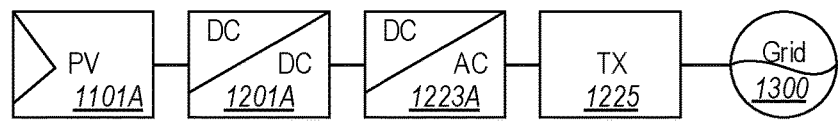
FIG. 6 symbolically illustrate the typical key modules of a grid connecting solar power generation string in which electric power passes from the power generator PV string, to the power extraction and preparation DC/DC converter, to the power condition device DC/AC inverter, to the power delivery device Transformer (TX), to then supply the loads connected to the grid.
Figure 7A:
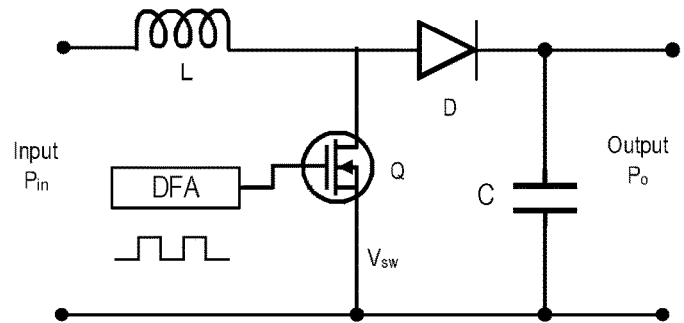
FIGS. 7A, 7B, and 7C illustrate a typical power extractor and preparation device; namely, the DC/DC converter.
Figure 7B:
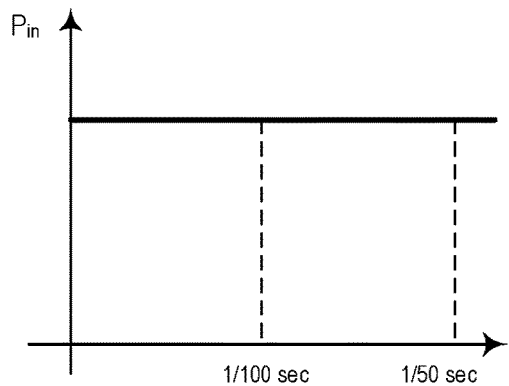

FIG. 6 shows the components of a solar power generation sequence 1101. The sequence starts at the photo-electric energy conversion device (PV string) 1101A, which generates electricity energy from the photo energy as primary energy source. The electrical energy is then extracted by a DC/DC converter 1201A. As described later, the DC/DC converter 1201A can also enhance or reduce the DC voltage inputted from the PV string 1101A to a voltage suitable for the DC/AC converter 1223A. In other words, the DC/DC converter 1201A may act as energy preparation module 1222 depicted in FIG. 1. The DC/AC converter 1223A conditions the DC prepared power into an AC voltage power source. The AC power is then feed through a transformer 1225 (in FIG. 6) to deliver the power into a grid that is connected to load 1300. The grid combined with all connected loads is one example of the "load" 1300 described in FIG. 1. A DC link (not illustrated in FIG. 6) may be used to connect the DC/DC converter 1201A and the DC/AC converter 1223A for smooth. FIG. 7A shows an example of a typical circuit design of a DC/DC converter 1201. Notice that DC/DC converter is also named as "booster" in the art.

Figure 7C:
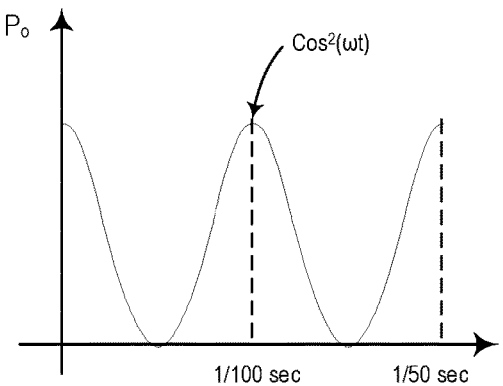

As shown in FIG. 7A, a DC/DC converter consists of an inductor L; a controllable switch Q regulated by a duty factor adjuster DFA; a diode D; and a capacitor C. The switch Q is switched at a high frequency (typically, 15 to 20 kHz PWM in commercial products) with a certain adjustable duty factor. This adjustable duty factor is regulated by a duty factor adjuster DFA to achieve the designed output voltage and power suited to the subsequent device in the sequence; namely, the DC/AC converter 1223A in the case of FIG. 6. The duty factor adjuster adjusts the duty factor as a function of time in accordance with the design to turn on/off the switch Q. Thus, with a properly designed circuit, the output voltage and power of the DC/DC converter can produce the desired voltage value, power form, and frequency that comply with the design requirement. In the case of a grid connected unit, the AC synchronous regulator (typically built in the DC/AC converter) is applied to drive the DFA to dictate the prepared output of the extractor so as to form an AC signal having an AC peak voltage p0, a pure sinusoidal power form of $\cos 2(\omega t)$, and phase synchronous with the grid. Such an AC signal is depicted in FIG. 7C.

During an on-period of the switch Q, the designed inductor L extracts the energy from the input unit. Specifically, the inductor L is charged by the input power within the time period specified by the duty factor of the high frequency switch. This charging occurs until the voltage vSW across switch reaches a proper value up that approaches the input voltage yin). When the switch Q is OFF, current flows from the inductor L through the diode D to charge the designed capacitor C, thus producing a voltage equal to the desired output voltage as function of time. By adjusting the duty factor of the on-off period of the switch Q of a properly designed fixed frequency DC/DC converter, one can use the input voltage to generate a properly suited voltage output that has the required frequency for the subwequent—(e.g., a DC/AC converter in the grid connected case). In this case, the design uses the synchronous regulator of the DC/AC converter to dictate the required frequency, and the time-varying voltage to timely regulate the duty factor adjustment. Thus, a pure sinusoidal power form is produced that is represented by $\cos 2(\omega t)$, with the required frequency, with the required peak voltage, and with its phase synchronous with the grid.

Notice that the conventional DC/AC converter is often combined with the above DC/DC converter as one of its components. Such a combined unit is also called a "DC/AC converter" in the art. Therefore, unless otherwise specified herein, the combined "DC/AC converter" unit is also an example of the energy extractor described herein. Unless otherwise specified herein, the herein referred energy extractor can not only perform the energy extraction; but also can perform "preparation and conditioning" of the energy to be delivered to the load.

Referencing FIG. 1C; the controller efficiency is defined as the energy consumed by the load plus the stored energy divided by the energy generated by the generator. Referencing FIGS. 1A and 1B, controller efficiency is also equals to ((the power extraction efficiency of the device 1210)×(the power delivery efficiency of the device 1220)) in the case where the system is designed without an energy reservoir to hold the surplus energy for later usage. The "energy utilization efficiency" is also defined the same way, and equals to the controller efficiency.

The device 1210's power (energy) extraction efficiency is defined as the instantaneous value of power output from device 1210 divided by the maximum power generated at the generator(s), when conforming to the MPPT practice. Any generated power not being picked-up (extracted) by the device 1210 contributes to inefficiency in the device 1210. The device 1220's power (energy) deliver efficiency is defined as the instantaneous value of the device 1220's power output delivered to and consumed by the loads divided by the power output of the device 1210.

Notice that the energy delivery efficiency is zero when there is no load demand. Furthermore, for designs that have no energy reservoir, the energy extraction efficiency is also zero when there is no load demand. Thus, the load demand and the energy reservoir capacity can affect the energy delivery efficiency and the energy extraction efficiency. This fact shows that the power extraction, preparation, and delivery are intimately related to the power demand. Accordingly, MPPT practice alone does not lead to derive maximum energy benefit from an energy system.

To elaborate further, some types of loads (such as waterpump(s)) have very narrow operation power range; and can cause power system disruption when there is a gross mismatch between power production and consumption. When the delivered power is below the lower limit of power demand, the load can stop functioning, and suddenly disengages from the power demand. For instance, when the supplying power is lower than the lower limit of a waterpump operation; the pump just stops pumping and disengages from the load demand, thereby wasting the generated energy. On the other hand, when the delivered power is higher than the maximum power demand range, either some of the power will not be picked-up by the energy extraction device 1210 which wastes part of delivered energy get wasted; or load disengagement occur. The above situations can occur regardless of whether the generator is operated at its MPPP voltage or not. The above power mismatching situations are real; and commonly and frequently occur in green energy systems (including solar powered water pump systems).

The above analyses on energy system depicted in FIG. 1A can be summarized as follows. First, the power demand of the load can greatly affect the energy deliver efficiency as well as the energy extract efficiency. Secondly, because of this, the power demand of the load can also affect the controller efficiency, thereby multiplying of these two efficiencies (and thereby further compounding inefficiencies). Third, the operation point of maximum controller efficiency may not coincide with the MPPT operation. Fourth, the blind MPPT conformation does not guarantee the maximum amount of energy benefit is derived from the energy system. Fifth, and most importantly, in order to optimize the energy benefit (utilization) from an energy system, energy extraction should be decoupled from energy delivery because this decoupling allows the energy production/extraction and energy preparation/consumption to be separately optimized whilst still complying with energy and charge conservation laws.

Section Two: The Embodiments Described Herein and their Impact

Before describing embodiments of the invention, let us examine the life time of energy sources. Energy stored in fossil fuel or battery (chemical energy), or stored in water of high ground (potential energy), or stored in spinning wheels (kinetic energy) belongs to the long-lived energy form; because the energy in the same energy form can continue to exit in minutes, in hours, in years, or even in centuries. On the other hand, the life time of some energy forms are shorter. As examples, wind power, tidal-wave power, and thermal power can dissipate in a short time, typically in milliseconds to seconds. Another example, when not in charge isolation state or superconducting state, the life time of electric energy can only last for extremely short time of less than $10^{-7}$ seconds (e.g., less than 100 picoseconds). Therefore, after converting chemical energy (in fossil fuel) into thermal power; most of fossil-fuel power plants immediately convert such thermal power into spinning kinetic energy before generating any electricity. Once the electrical energy is generated, it must be consumed in an extreme short time.

When one utilizes short lived green energy as the primary energy source to directly produce extremely short lived electric energy in DC form thereafter converting such into AC form, one should consider that the extraction speed of less than mega-hertz switching in the extraction device (DC/DC converter combined with DC/AC inverter) is not able to extract all the electric energy generated before it turned into useless non-electric forms (heat or light). One should also prevent the energy loss via broadcasting radiation if using above mega-hertz high frequency switching for the above-stated power extraction. Thus, the principles described herein employ proper extraction methods, and build in adequate electric energy reservoir to store the generated electricity that allows this to become possible. However as observed today, almost all of the conventional green energy systems are not designed to employ proper energy extraction, also are not equipped with an adequate long lived energy storage reservoir for the generated electricity.

Due to lack of proper power extraction, a large fraction of electrical energy produced in the conventional green energy systems is not extracted for utilization and is thus wasted. This fraction of produced (but not extracted or utilized) electrical energy is referred to as the "surplus energy" herein. The inventors recognized that there is a large amount of surplus energy lost in green energy systems, and also recognized that the generated electrical energy can be stored in a battery (chemical form), a capacitor (charge isolation), or other forms to prolong its life time. Therefore, the inventors proposed the principles described herein to properly extract, store, and utilize the surplus energy. As will be described in detail later, this disclosed innovation proposes methods to extract surplus energy working in conjunction with designed adequate energy reservoir that can almost completely extract, store, and utilize the generated electricity in green energy systems.

As depicted in FIG. 1B, the energy system embodiment in accordance with the principles described herein, adds a device 1230 consisting of a device 1233 working in conjunction with an energy reservoir 1235. The device 1230 is named as the "surplus regulator"; and the device 1233 is named as the "surplus extract/utilize device" herein. The device 1233 comprises four modules; 1233A, 1233B, 1233C, and 1233D; which have functions and effects that will be described hereinafter. When properly designed, the device 1230 can selectively store the surplus energy during energy extraction, and increase or reduce the supply-power to the load during the energy delivery. The device 1230 can also smoothly and effectively handle power mismatching.

To elaborate, the device 1233 can selectively store the maximum amount of the available surplus energy in the energy reservoir 1235 over the long term during energy extraction process. The "surplus energy" is defined as the energy produced by the generator(s) but that is not picked-up by the conventional energy extraction device 1210. Thus, the device 1233 helps the energy management subsystem 1200 extract the maximum amount of energy from the generator; even when load disengagement occurs. The embodiment of FIG. 1B makes the surplus energy useful and greatly improves the energy extraction efficiency.

Using the energy stored in the reservoir 1235, the device 1233 can also selectively provide the needed insufficient energy into the preparation module 1223; such that the delivery module 1225 of the device 1220 can deliver power to satisfy a load demand that is larger than the extracted power or potentially that is even larger than the generated power. This results in increased energy supply to smoothly and effectively bridge through periods of high load demand. Thus, the principles described herein can reduce the frequency of load disengagement and greatly improve energy delivery efficiency. The principles described herein can also prolong the power supply time via the stored surplus energy when there is no production; and increase the amount of energy utilization. This is especially true for solar energy system that often endure hours of cloudy or night-time conditions in any given 24 hours period.

To summarize, the conventional design does not consist of the device 1230 and its modules that selectively pick-up the surplus energy, that adjust the right amount of delivery energy, and/or that provide sufficient energy such that the right amount of energy is delivered to exactly satisfy the instantaneous load demand. Accordingly, the conventional design lacks the benefit of maximum energy utilization described herein. The apparent differences between the conventional system and the system in accordance with the principles described herein can be seen by comparing the block diagrams in FIGS. 1A and 1B.

With the principles described herein, the power extracted from the power generator is the combination of the power extracted by the conventional device 1210 and the surplus power extracted by the added device 1230. As will be described further below, the principles described herein also proposes mechanisms that can make the sum of the two extracted power be very close to the generated power. Therefore, neglecting the energy consumed by the devices 1210 and 1230, the energy extraction efficiency of the embodiments can be approximately 100%.

Also, with the principles described herein, the device 1230 can regulate the power extracted; through the management functions provided by the modules of the device 1233 (devices 1233A, 1233B, 1233C, and 1233D) to combine the available energy from the generator and the reservoir; and to assist the devices 1223 and 1225 (modules of the device 1220) in providing the right amount of power to satisfy the instantaneous load demand with near exactness. Thus, the device 1230 can also provide the ability to decouple energy production from energy consumption (i.e., utilization).

As will be described further below, the principles described herein offer mechanisms that can arrange the power to be very close to the right amount of input power for the device 1220; such that the output power of the device 1220 can satisfy the momentary power demand with near exactness. Therefore, neglecting the energy consumed by the devices 1220 and 1230, the embodiment's energy deliver efficiency can also approach 100%. Thus, the principles described herein decouples the power generation and consumption through management functional modules 1233A, 1233C and 1233D working in conjunction with the energy reservoir 1235 and device 1233B; resulting in the capability of independently optimizing energy production, extraction, and delivery.

To summarize, accordance with the principles described herein, a device 1230 is added to selectively store the surplus power into the proper temporary reservoirs; which device 1230 can theoretically improve energy extraction to 100%. The added device 1230 (specifically, its modules 1233C and 1233D) can also selectively combine the energy extracted from the generator 1100 and the energy in the reservoirs (1235 and device 1233B) into the right amount of energy; and then deliver this right amount of power as input to the device 1223, such that the output power of the device 1225 can satisfy the load demand with near exactness. This can theoretically improve the energy supply efficiency to 100%. Thus, the principles described herein can decouple and independently optimize the efficiencies of the power production, extraction, and delivery.

To summarize; assuming compliance with the law of energy conservation, the instantaneous power consumption by the load typically does not nearly equal to the power production in any energy system. Without device 1230, when the power demand is larger than the capacity (which is defined as the capacity of power produced, extracted, prepared, and delivered), the power demand can cause load disengagement and greatly reduce energy utilization efficiency. On the other hand, when the capacity is greater than the power demand, left-over power could result, which is not being extracted or delivered; thereby reducing the energy deliver (utilization) efficiency.

By adding the device 1230 which consists of the device 1233, this embodiment of FIG. 1B can selectively temporarily store the right amount of surplus energy; and/or provide the right amount of energy to exactly satisfy the power demand in amounts either higher or lower than the instantaneous power capacity or even the generated power. This effectively eases the problems described above and also derives maximum energy benefit from any energy system.

Section Three: Review on Conventional Energy Extractors

Conventional energy extraction devices include DC/AC converter and the pulse width modulation (PWM) energy extraction device. This section investigates these two typical conventional energy extractors to reveal the root cause of their ineffectiveness and inefficiency.

Note that the DC/AC converters referred in this section are those units which combined with the DC/DC converter described in Section One. Also note that the PWM energy extraction devices referred in this section is the stand alone DC/DC converter described in Section One. Recall that the referenced DC/AC converter incorporates the DC/DC convertor as its component; and named as the "DC/AC convertor". The switch Q in the DC/DC convertor is switched at a high frequency (typically, 15 to 20 kHz PWM). The duty factor of the PWM signal is regulated by a duty factor adjuster DFA to achieve the designed output voltage suited to the DC/AC converter. When the duty factor adjuster regulates the duty factor as a function of time in accordance with the synchronous regulator (typically built in the grid connected DC/AC converter), the energy system can deliver AC power that conforms to the grid AC frequency, peak voltage, power form, and phase.

Without losing generality, assume that the primary energy source can hold at constant intensity (and can have constant power production from the generator) for a few seconds. As a first review case, the produced power is at a constant value, say at DC current I1, DC voltage V1, and thus a DC power P1=V1*I1*pf, (where pf equals 1 in the case of DC). In this first review case, the energy extracted is represented by a conventional "pure sinusoidal DC/AC converte of 50-60 Hz", as in the most of the largest PV solar power stations. This first review case will now be examined in detail as follows.

Figure 2A:
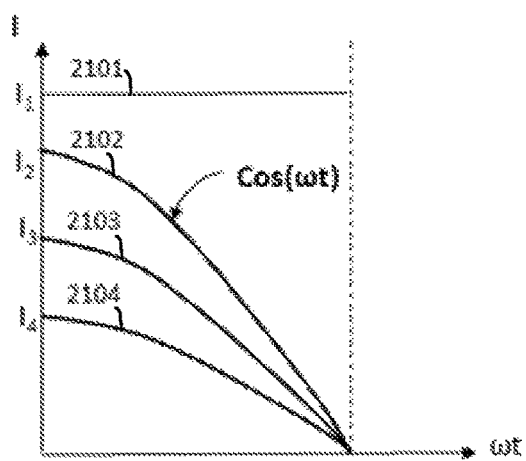
FIGS. 2A through 2C symbolically illustrate the current, voltage, and power, respectively, of a DC generator extracted by a DC/AC inverter, under different load demands, as function of time.

As shown in FIG. 2A; the current of the generator output is depicted as the curve 2101; with a constant DC current of I1. Curves 2102, 2103 and 2104 depict three different and typical load-demand cases in which the current extracted from an AC converter are characterized by a quarter cycle single phase cosine-wave (neglecting loss such that input equals output). Curve 2102 is represented by I2*cos ($\omega$t); curve 2103 is represented by I3*cos ($\omega$t), and the curve 2104 is represented by I4*cos ($\omega$t). The charge conservation law only allows: I1>I2, I1>I3, and I1>I4. The 4 averaged currents are I1, (2/$\pi$)*I2, (2/$\pi$)*I3, and (2/$\pi$)*I4, respectively, where n=3.1416.

Figure 2B:
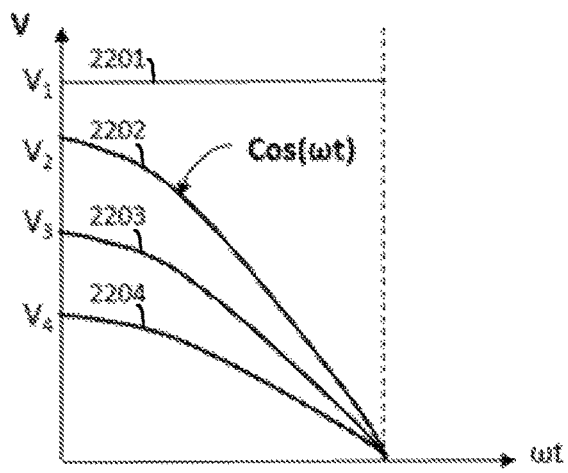

As shown in FIG. 2B; the voltage of the generator output is depicted as the curve 2201; with a constant DC voltage of V1. Curves 2202, 2203 and 2204 depict three different and typical load demand cases in which the voltage extracted from the AC converter are characterized by a quarter cycle single phase cosine-wave (neglecting loss such that input equals output). Curve 2202 is represented by V2*cos (ωt); curve 2203 is represented by V3*cos (ωt), and curve 2204 is represented by V4*cos (ωt). The energy and charge conservation laws only allow V1>V2, V1>V3, and V1>V4. The 4 average voltages are V1, (2/π)*V2, (2/π)*V3, and (2/π)*V4, respectively.

Figure 2C:
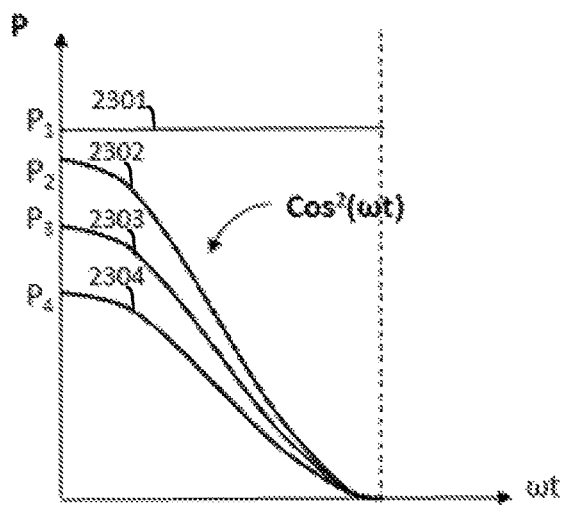

As also shown in FIG. 2C; the power of the generator output is depicted as the curve 2301; with a constant DC power of P1. Curves 2302, 2303 and 2304 depict the three different and typical load demand cases in which the power extracted from the AC converter is characterized by a quarter cycle single phase pure-cosine-wave. Curve 2302 is shown as P2*cos(ωt)*cos(ωt)*pf; curve 2303 is shown as P3*cos (ωt)*cos (ωt)*pf, and curve 2304 is shown as P4*cos(ωt)*cos (ωt)*pf. The pf is the power factor of the load. The energy conservation law only allows P1>P2, P1>P3, and P1>P4. Taking pf=0.75 (above the regulation demanded pf>0.7), the 4 averaged-power are: P1, 0.375*P2, 0.375*P3, and 0.375*P4, respectively.

The fraction of energy extracted from the generator by this pure sinusoidal converter is the averaged power output of the energy extractor divided by the averaged power generated. The energy fractions of these 3 represented typical extractions that characterize the different load-demand cases are: 0.375*P2/P1 for curve 2302, 0.375*P3/P1 for curve 2303 and 0.375*P4/P1 for curve 2304 respectively. Therefore, the energy extraction efficiency for this power extractor cannot be greater than 0.375, even taking an extreme favorable case where P1 equals P2. In less favorable cases. the energy extraction efficiency would be lower value.

The following may be concluded from the above analyses. First, for the conventional power extractor used in most of the larger PV solar power stations, the DC/AC converter can only extract less than 37.5% (take it as "less than 40%" hereinafter for convenience) of solar-electric power generated by the solar panels in the solar power generator(s); Second, with a properly designed surplus energy extraction device 1230 consisting of the device 1233 and energy reservoir 1235, the principles described herein can improve the energy extraction by well more than a factor of 2 over the conventional converter.

The next subsection examines the other typical conventional energy extractor, the PWM energy extraction device. Without losing generality, again assume that the primary energy source can hold at constant intensity (and can have constant power production in the generator) in a period of seconds. The produced power is at a constant value (say at DC current I1, DC voltage V1, and thus a DC power P1=V1*I1) while the energy is extracted by a conventional PWM extractor. This case can be examined as follows.

Figure 3A:
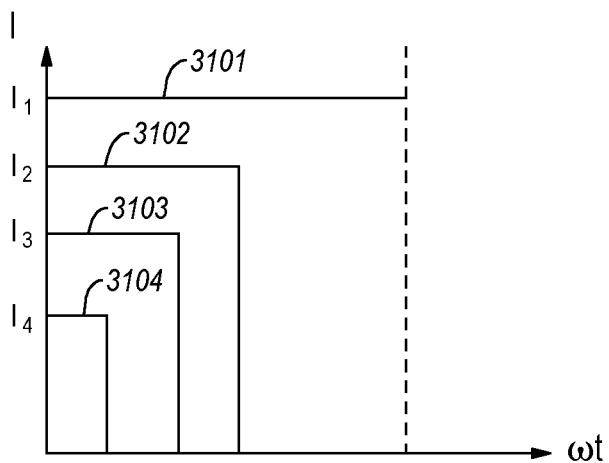
FIGS. 3A through 3C symbolically illustrate the current, voltage, and power, respectively, of a DC generator extracted by a Pulse Width Modulator (PWM) energy extractor, under different load demands, as function of time.

As shown in FIG. 3A; the generated current is depicted as the curve 3101, which is a constant DC current of I1. Neglecting loss (input=output) a typical PWM energy extractor's three example currents representing three different load-demand cases are depicted as the curve 3102 with amplitude I2 and duty factor of δ2, the curve 3103 with amplitude I3 and duty factor of δ3, and the curve 3104 with amplitude I4 and duty factor of δ4. The charge conservation law only allows: I1>I2, I1>I3, and I1>I4. The 4 averaged currents are: I1, δ2*I2, δ3*I3, and δ4*I4 respectively.

Figure 3B:
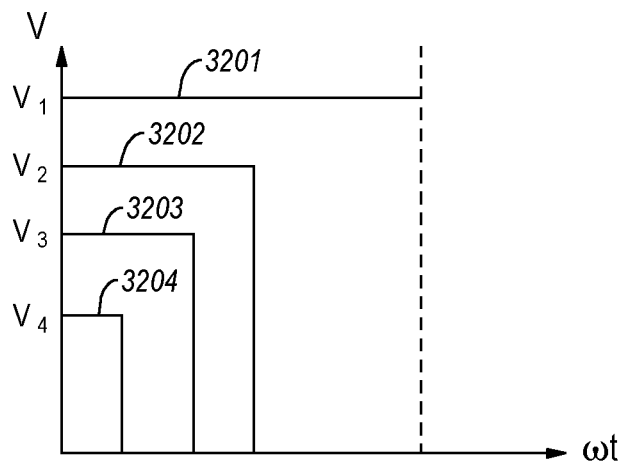

As shown in FIG. 3B; the generated voltage is depicted as the curve 3201, which is a constant DC voltage of V1. Neglecting loss (input=output) the PWM energy extractor's 3 example voltages representing three different load-demand cases are depicted as the curve 3202 with amplitude V2 and duty factor of δ2, the curve 3203 with amplitude V3 and duty factor of δ3, and the curve 3204 with amplitude V4 and duty factor of δ4. The energy and charge conservation laws only allow: V1>V2, V1>V3, and V1>V4. The 4 respective average-voltages are: V1, δ2*V2, δ3*V3, and δ4*V4 respectively.

Figure 3C:
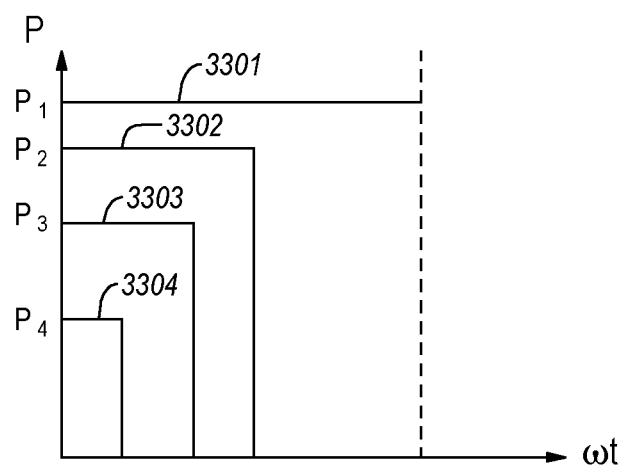

Also as shown in FIG. 3C; the generated power is depicted as the curve 3301, which is a constant DC power of P1=V1*I1. Neglecting loss (input=output) the typical PWM energy extractor's 3 example power representing three different load-demand cases are depicted as the curve 3302 with amplitude P2=V2*I2*pf and duty factor of δ2 ("pf" is the power factor of the load), the curve 3303 with amplitude P3=V3*I3*pf and duty factor of δ3, and the curve 3304 with amplitude P4=V4*I4*pf and duty factor of δ4. The energy conservation law only allows: P1>P2, P1>P3, and P1>P4. The 4 power average-values are: P1, δ2*P2*pf, δ3*P3*pf, and δ4*P4*pf respectively.

The fraction of energy extracted from the generator by the PWM energy extraction device is the averaged power output of the energy extractor divided by the averaged power generated. The energy fractions of these represented 3 typical extractions are: δ2*pf*P2/P1 for the curve 3302, δ3*pf*P3/P1 for the curve 3303 and δ4*pf*P4/P1 for the curve 3304 respectively. Therefore the energy extraction efficiency for the PWM energy extractor cannot be greater than 0.6—that is taking extreme case of P1=P2 and δ2=0.8 (which is the typical upper duty factor of 0.3 to 0.8) and also taking pf=0.75. Otherwise, the P1>P2 case would make the energy extraction efficiency even lower; and also the lower the duty factor (in the cases of low power production or low load-demand) the lesser the energy extraction efficiency.

As analyzed above: the PWM device (which is the conventional power extractor used in most of solar power street lamps) can only extract less than 60% of solar-electric power generated by the solar panels. With a properly designed surplus energy extraction device 1230 consisting of the extractor 1233 and the reservoir 1235, the principles described herein can improve the energy extraction at least by a factor of 1.5 over that of the conventional PWM extractor. This section clearly reveals the root-cause of the inefficiency and ineffectiveness in using the conventional extractors.

Section Four: The Proposed Mechanisms for Nearly Perfect Energy Extraction

There are three ways to design the device 1233, to extract the most amounts of surplus energy from the generator, where "surplus energy" is the energy left-over from the conventional extraction device 1210. The three ways are referred to herein as the active way, the passive way, and a combination of the two. The device 1230 is named as the "surplus regulator" and the device 1233 is named as the "surplus core-regulator" hereinafter.

Figure 8D:
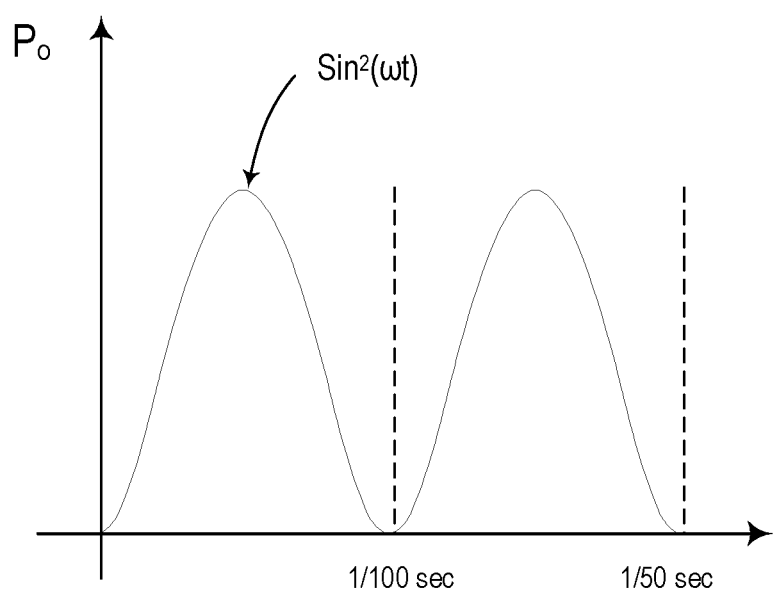

FIG. 8A shows a circuit for the surplus power extractor 1201S at its lower half; which is almost identical to the circuit of the power extractor 1201 at its upper half. The device 1201 exacts and prepares the generated electric energy as described in Section One. Notice that the surplus power extractor 1201S depicted in FIG. 8A does not have duty factor adjuster DFA. The gate of its switch Qs is connected to the DFA of the power extractor 1201 through an out-of-phase locking module (a flip-flop). That is, when Q is on, Qs is off; and when Q is off, Qs is on. The DC/AC converter without the DC/DC converter is referred to as the "pure DC/AC converter" hereinafter.

Notice that the DFA of the device 1201 is regulated by the grid synchronous regulator in the grid connecting green power systems. Therefore the prepared output of the extractor has the following attributes—an AC peak power of p0, a pure sinusoidal power form of cos 2($\omega$t), an AC frequency (50 hertz as depicted), and its phase synchronous to the grid that are depicted in FIG. 7C and in FIG. 8C. Also, notice that the output of the surplus extractor 1201S depicted in FIG. 8A conforms to the same peak power p0, and the same AC frequency (50 hertz as depicted). However, its power form is a pure sinusoidal of sin 2($\omega$t), not cos 2($\omega$t) (depicted in FIG. 8D). Accordingly, the power form of the surplus extractor 1201S has a 90 degree phase difference from the grid.

This is evidence that the surplus extractor (e.g., device 1201S) proposed in the principles described herein can produce a power output having the same frequency, and the same peak power as the power extractor (e.g., device 1201), but be 90 degrees out of phase to that power produced by the power extractor. Notice also that the sum of the power outputs from these two DC/DC extractors can yield a value very close to the value of the input DC power. In other words, any of the two extractors can extract power up to a value that is complementary to the extraction of the other. Or to phrase it differently, power extracted by one extractor can be approximately equal to the input power value subtracted the value of power extracted by the other extractor.

When output of the device 1201 is connected to a pure DC/AC converter as depicted in FIG. 6, the "pure DC/AC converter" then takes the well prepared power output; and performs the designed "power conditioning" function to produce an power output conformed to the grid frequency and all other AC grid requirements. Those of ordinary skill in the art can design a proper link to deliver the pulsating DC power train from the surplus extractor to charge a DC reservoir. The extracted power thus can charge the reservoir 1233B or 1235 depicted in FIG. 1B to be used in ways that described herein.

For instance, in the case that the device 1210 is a "pure sinusoidal DC/AC converter", the principles described herein proposes to add another 90 degree out-of-phase converter 1233A with its phase locked onto the first converter 1210. The 1233A module is named as the "active surplus extractor" herein.

Figure 4:
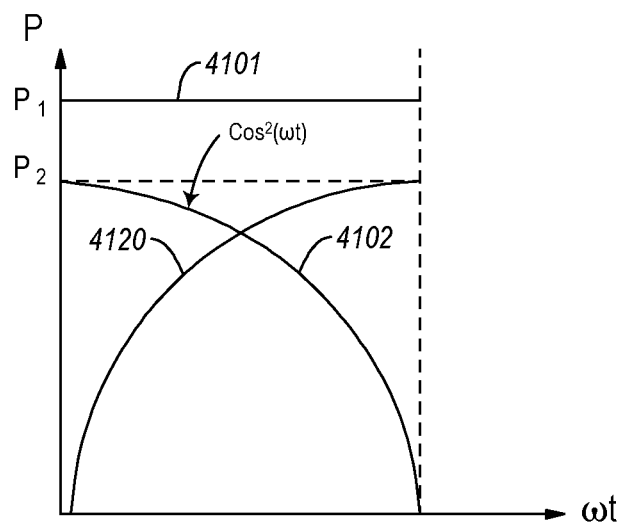
FIG. 4 symbolically illustrates a mechanism to extract the surplus power left-over from the DC/AC inverter's energy extraction in accordance with the principles described herein.

To elaborate, FIG. 4 depicts this concept schematically. The curve 4101 depicts the generated DC power P1. The power extracted by the conventional energy extractor, the converter 1210, is depicted as the curve 4102; representing the power extracted P2*cos($\omega$t)*cos($\omega$t). The curve 4120 represents the power extracted by the other converter 1233A that is locked 90 degrees out of phase, that is P2*sin($\omega$t)*sin($\omega$t). Note that cos($\omega$t)*cos($\omega$t)+sin($\omega$t)*sin($\omega$t) is identically equal to unity. Thus, total power extracted by the two devices 1210 and 1233A is summed up to be exactly equal to P2; as depicted in FIG. 4.

When P2 equals P1, the total energy extraction efficiency of these two combined devices is perfect at 100%. When P2 is less than P1, there is still some constant amount (P1-P2) of power left-over from the combined extraction. This constant left-over power can then be effectively and easily extracted by a matched capacitive/Faraday device 1233B to theoretically reach a perfect extraction. The device 1233B is also named as the "passive surplus extractor" herein. The capacitive/Faraday device 1233B can be a part of the energy reservoir 1235; but FIG. 1B depicts it as a separate entity to emphasize its distinct function. With the combination of extraction in devices 1233 and 1210, one can theoretically extract all the generated energy.

Figure 5:
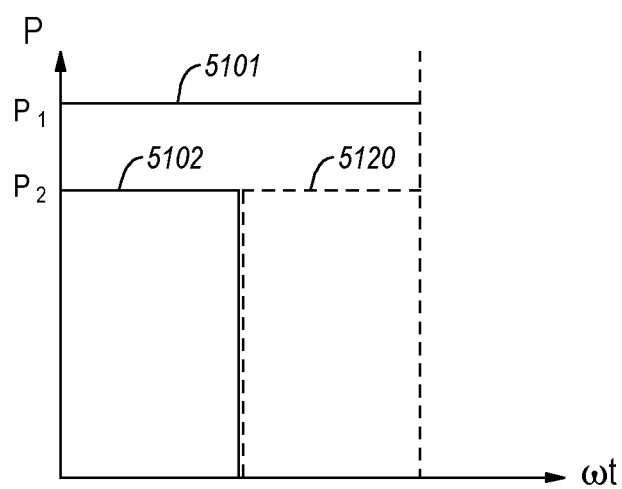
FIG. 5 symbolically illustrates the proposed mechanism to extract the surplus power left-over from the PWM energy extractor's extraction in accordance with the principles described herein.

In the case that the device 1210 is a PWM energy extractor, embodiments described herein may add another out-of-phase PWM energy extractor 1233A with its phase locked onto the first extractor 1210. FIG. 5 depicts this concept schematically. The curve 5201 (represented as a solid line) depicts the generated DC power, P1. The power extracted by the PWM 1210 is depicted as the curve 5202 (represented as a dashed line), representing the extracted power with amplitude P2 and duty factor δ2. The curve 5202 represents the power extracted by the other PWM 1233A phase locked to be out-of-phase with the first extractor 1210, and with the extracted power is with amplitude P2 duty factor (1−δ2) and out of phase with respect to curve 5202. The total combined extracted power is then exact equal to P2; as depicted in FIG. 5.

When P2 equals P1, the total energy extraction efficiency of these two combined devices is a perfect 100%. When P2 is less than P1, there is P1-P2 constant power left-over from the combined two power extraction devices 1210 and 1233A. This constant left-over power can be effectively and easily extracted by a matched capacitive/Faraday device 1233B to reach nearly perfect extraction. The capacitive/Faraday device can be a part of the energy reservoir 1235; but FIG. 1B depicts it as a separate entity to emphasize this distinct function. With the combination of the extraction devices 1233 and 1210, one can theoretically extract all the generated energy again.

Notice that different power production and load demand would produce different left-over power (i.e., (P1-P2)) to be nearly perfectly picked-up by the passive surplus extractor 1233B. Fortunately, in practice, the energy system does not require an exact matching Capacitive/Faraday device 1233B to passively extract most amounts of the left-over surplus power. By exercising fundamental electrical design skills, one can produce good designs for the needed Capacitive/Faraday device to passively extract the most amount of left-over surplus power. However, the generator operating voltage will then be passively shifted from the MPPP voltage to a new voltage that derives the maximum power extraction (summing all the power extracted by the extractors 1210, 1233A, and 1233B). In practice, this new voltage is typically at the vicinity of the MPPP voltage. In other words, the subsystem of the production/extraction of a system incorporating the principles described herein can still operate at a voltage near the MPPP to maximize the sum of power extracted; and produces near-maximum power at the same time.

In another embodiment, the principles described herein propose to extract and store the electric energy generated in DC form first. Ordinary skills in the art can be employed to design a device that can first store almost all the power produced in the PV power generator into a large enough energy reservoir consisting of large capacitor and batteries. The power in the reservoir can be extracted by a DC/AC converter and produce the grid conformed AC power output. The reservoir is DC charging by the generator and at the same time AC extracting by the power extractor. The DC input power to the reservoir subtracted by the AC power form extracted by the DC/AC inverter would also yield a DC pulsating-power-train in time demand. This "fictitious" DC power form is equivalent to a DC pulsating power train having the same frequency but 90 degrees out of phase with the grid. Therefore, this large energy reservoir can be viewed as a passive surplus extractor using the principles described herein.

Notice that the power extractor can be a unit that consists of several combined extractors. These extractors can extract the power from the reservoir in different phases. One of these extractors can be viewed as the power extractor; and all the other extractors plus the large energy reservoir can be viewed as a kind of surplus extractors. This is referred to as an active passive combined surplus extractor in the principle described herein.

Section Five: Review on Conventional Energy Delivery Managements

This section examines conventional energy delivery (supply) management. After energy is extracted from the generator, the energy system conditions (or prepares) the energy; and then delivers the energy to the load 1300 for consumption. This process is named herein as "the energy supply"; or preferred to name as "the energy delivery".

The first important issue in energy delivery (supply) management is the protection of the energy system from overloading power demand. The second important issue is the prevention of damage to the energy due to the load disengagement. In other words, the instantaneous power demand should not exceed the designed maximum delivery power capacity (defined in the next paragraph)—otherwise, the load might be disengaged. Also, the energy delivery management should deal with any sudden load disengagement immediately to prevent damage to the equipment, especially damage to electronic gears.

The instantaneous maximum power supply capability of a conventional power station can be determined experimentally through the following measurements. First, measure the instantaneous maximum power generation P1*. Also, measure the instantaneous maximum power extraction P2*. The power P1* goes through the device 1210 to produce the measured P2* which is less than P1*. The instantaneous maximum delivery power P3* is measured. This power P2* goes through the device 1220 to produce the measured P3*. P3* is less than P2*, which is less than P1*. The power P3* is defined as the instantaneous power delivery capacity of this power station. It is the maximum available power to the load at that moment. When the P1* reaches its designed maximum value, the corresponding P3* is named as the "designed maximum delivery power capacity" of the energy system. Notice that the values of P1*, P2*, and P3* in a green energy system (such as solar power station) vary in time; and that the power P2* is much less than the power P1* when using conventional energy extractor(s).

Knowing the measured output power P3* of the device, one can determine the instantaneous power supply capacity of the power station. However, due to intimate coupling with the load demand, the instantaneous efficiency of the energy delivery is still unknown. For example, when the load 1300 demands a power P3 and the demanded power P3 is less than the power P3*; the device 1220 can deliver the amount of power P3 to the load. In this case, the instantaneous energy delivery efficiency is the load demand power P3 divided by the power P2*. However, when the load demand power P3 is larger than the instantaneous power delivery capacity power P3*, the device 1220 may refuse that power demand; resulting in the load disengaging, which sets the instantaneous energy delivery efficiency to zero.

Notice that the amount of mismatched power (P3*−P3) cannot be delivered to the load for consumption; and such mismatched amounts becomes heat within the system, which can be troublesome. When the load disengages, P3 is equal to zero. In this case, the large heating power, P3* is dumped as heat right into the circuitry of the system. This huge heating power can cook components of the system, such as the generator, the extractor, or the management gears. Because the primary energy input can vary in time with large amplitude, say from zero to a certain large maximum value; the instantaneous power supply capacity P3* of a green energy system can also vary from zero to a certain large maximum value. Therefore, the constant large load demand P3 can often be larger than P3*; causing the load to disengage from the energy supply to set the instantaneous energy delivery efficiency (so as the energy utilization efficiency) to zero. Any green energy system designed to drive a large constant load demand (such as solar water pump station) will definitely and commonly face this trouble.

For instance, sunlight is the primary energy for solar powered water-pump stations; which are designed to drive a large load demand during pumping of water. During a sunny clear day, the amount of sunlight flux delivered onto the solar panels starts as zero at dawn. The flux is defined as the total amount of photons that pass through to a defined area of the solar panels per unit time. Sunlight shines horizontally at dawn; and does not pass through horizontally mounted solar panels. Thus, the flux would be zero at dawn. The sunlight flux increases monotonically until noon (when the flux is directed downwards onto the panels' surface) to reach its large maximum power production. Thereafter, the sunlight flux decreases monotonically in the afternoon to returns to zero in the evening at sunset which sunlight shines horizontally again. However, there might be thick clouds casting a dark shadow onto the solar panels for some period time in this example day. When the shadow is too dark for the system to provide adequate power to maintain the running pump, the pump disengages the load. This generated power may not be enough to drive the large pumping load, but may significantly damage the electronic gears inside. The principles described herein address this issue also.

On the other hand, the amount of the power supply capacity P3* may be larger than the load demand P3. In that case, the power amount (P3*−P3) is not delivered to the load. This surplus energy is wasted without an energy reservoir. This portion of wasted energy shall be counted as another inefficiency of the device 1200. To reduce the station's capital cost, typically the large commercial solar power stations are not designed to include an energy reservoir. Thus, the above conclusions of the above analysis represent real and common issues.

To evaluate the energy delivery efficiency of the device 1220; as an example, let us study the following scenario representing the common, typical, and real situations. Suppose there is a solar water pump station that pumps water having a 120 meters water head, and that consists of four relaying staged pumping segments, each with 30 meters water head. The 4 pumps are with the same running power rating Pr, and with the same required starting power Ps. Typically the starting power Ps is greater than 3 times the running power Pr. In some pumps, the starting powerPs even exceeds 7 times the running powerPr.

First, let us examine the conventional solar water-pump station case. This solar water pump station encounters "12 time periods of one particular good sunny day". These 12 periods are described as following:

(1): the solar panels (referred as the solar station hereinafter) do not generate any electricity before dawn (say 6 AM) because there is no sunlight energy input; P(t1)=0; no power generated, no power extracted, no power delivered, and no energy utilized. The energy utilization is 0.

(2): From dawn (6 AM) to 7 AM; the solar station generates solar power P1*, extracted P2* power, and has power supply capacity P(t2)<Pr, and thus the extracted power is not strong enough to even maintain a running pump Pr (let alone start a pump). Note that Pr=Vr*Ir, where Vr and Ir are the voltage rating and current required to maintain the running pump. Since the DC/AC converter is used to extract the generated power, P2*<0.4P1*, the power supply capacity P(t2)=P2* (neglecting the power loss in the device 1220), and P2*<Pr. The station produced P1*<2.5 Pr power, extracted P2*<Pr power, and has a power capacity less than the required pumping power. Accordingly, the extracted power does not engage the pump as a load to thereby consume the generated solar power. Again, there is zero energy utilization.

(3): From 7 AM to 8 AM, the solar station increases solar power generation; produced ~2.5*1.3 Pr power, extracted ~1.3 Pr power, and has a power supply capacity up to P(t3)~1.3 Pr, enough to maintain one running pump; but not strong enough to start the pump (with Ps, Ps=Vr*Is). Notice that typically it takes >3 times of Ir (Is>3 Ir) to start a pump at its voltage rating. The energy utilization is again zero.

(4): From 8 AM to 10 AM, the solar station increases solar power generation; produced ~2.5*2.9 Pr power, extracted ~2.9 Pr power, and has a power supply capacity up to P(t4)~2.9 Pr. This is strong enough to maintain one running pump; but still not strong enough to start the pump. The station cannot engage the pump as load to consume the generated solar power. Energy utilization is again zero.

(5): From 10 AM to 12 AM, the solar station increases solar power generation; the station produced ~2.5*3.7 Pr power, extracted ~3.7 Pr power, and has a power supply capacity up to P(t5)~3.7 Pr. This is strong enough to start one pump. The station can start only one pump; and engage the pump load to consume the generated power. The energy utilization is only 2*Pr in this time period.

(6): It happens that suddenly a heavy cloud covers part of the sky above, and casting a shadow onto the solar panels at noon for ~30 minutes; referred to as the "shadow casting". The power supply capacity P(t6) plunges to below Pr; the system disengages the load and no power consumption in this period. Energy utilization is again zero.

(7): From 12:30 PM to 2 PM, the shadow gradually reduces its darkness to generate solar power at 2.5*2.9 Pr; extracted 2.9 Pr, with power supply capacity up to P(t7)~2.9 Pr; strong enough to maintain one running pump; but not strong enough to start the pump. The station still cannot engage the pump as load to consume the generated solar power. Energy utilization is again zero.

(8): From 2 PM to 4 PM, the sun-ray is good enough to generate solar power 2.5*3.3 Pr; extracted 3.3 Pr, power supply capacity up to P(t8)~3.3 Pr; strong enough to start one pump (Ps>3 Pr). One pump is started; and engaged to consume the generated solar power. The energy utilization is only 2*Pr.

(9): After 4 PM till 5 PM, the solar station decreases in solar power generation; extracted 2.3 Pr, with power supply capacity up to P(t9)~2.3 Pr; still enough to maintain the running pump. The station still engages the pump load to consume the generated solar power. The energy utilization is only 1*Pr.

(10): After 5 PM till 5:30 PM, the solar station decreases in power generation; extracted 1.1 Pr, with power supply capacity up to P(t10)~1.1 Pr; still enough to maintain the running pump. The station still engages the pump load to consume the generated solar power. The energy utilization is 0.5*Pr.

(11): After 5:30 PM till 6 PM, the solar-ray is sluggish, the station's power generation fluctuating up and down, with power supply capacity P(t11) also fluctuating at 1.1 Pr or below Pr. Once it is below the Pr, the station turns off the pump and do not have enough power to start the pump again during this time period. The station does not engage the pump to consume the generated solar power. Energy utilization is again zero.

(12): From 6 PM to 7 PM (the sunset darkness); although the solar station still generate some power with power supply capacity P(t12)<Pr; but it is not enough to maintain a running pump. The pump remains stopped; with no power consumption. After sunset, there will be no sunlight until next dawn; so the solar power generation stops and the pump also stops completely. Energy utilization is again zero.

The total energy utilization of this conventional solar water pump station is the sum of the energy utilization in the 12 periods; only 5.5*Pr (Whr) for the whole day. The total available energy to deliver for consumption is the sum of the power supply capacity multiplied by the time period in the 12 periods; about 28.3*Pr (Whr). Thus, the energy delivery efficiency of this conventional solar water pump station is 5.5 divided by 28.3, which is equal to 0.1943, which is about 19.4%. Because the energy extractor is a DC/AC converter; the fraction of energy extraction is less than 0.4 (neglecting the energy consumed by the device 1210 and the device 1220), derived in Section Four. Therefore, the energy utilization efficiency and the controller efficiency is lower than 0.4*0.1943=0.0777, which is <10%.

Section Six: The Energy Delivery Management

Before performing the evaluation of the energy delivery efficiency of the device 1220 in a solar water-pump station incorporating the principles described herein, let us further elaborate the management functions designed for the new modules 1233C and 1233D. To improve the energy delivery efficiency, the principles described herein proposes to incorporate modules 1233C and 1233D into the device 1230. The module 1233C is designed to selectively regulate the amount of power extracted by the device 1210; to adjust and produce an exact amount of energy P2 as input to the device 1220; such that the device 1220 can deliver the right amount of power to exactly satisfy the load demand, when the demand is less than the supply capacity. When the load demand is larger than the supply capacity, the module 1233C is also designed to selectively regulate the device 1210 to extract the maximum amount of power P2* from the generator's instantaneous maximum production power P1*; and also regulate the module 1233D to prepare and supply the needed additional power P2 from the reservoir 1235 and 1233B**, such that when the combination power of P2*+P2 is supplied into the device 1220, the device 1220 can deliver the right amount of power to exactly satisfy the load demand. This effectuates the supply energy enhancement to help the device 1220 handle bigger power demand than the system's instantaneous capacity provided by the instantaneous maximum power generated by generator 1100. Due to their functional characteristics, the device 1220 is named as the "supply power regulator"; module 1233C is named as the "power supply regulator"; and module 1233D** is named as the "power adjustment regulator" herein.

The next portion of this description evaluates the energy delivery (supply) efficiency of the device 1220 in a solar water-pump station incorporating these embodiments of the invention. As previously described, we shall again use an example in which there is a 120 meters water head solar water pump station that consist of four relaying staged pumping segments; each pumping a segment with 30 meters water head. The 4 pumps are with the same running power Pr, and with the same required starting power Ps. This solar water pump station encounters the same sunlight conditions as described above.

Without losing the generality but to keep the analysis simple; this analysis ignores all power consumptions in the devices 1210, 1230, and 1220; and takes the energy extraction efficiency to be 100% which makes the power supply capacity increased by a factor of 2.5 from the conventional converter case. The 12 time period scenario is repeated and described as follows:

(1): the solar station do not generate any electricity before dawn (say 6 AM) because there is no sunlight; P(t1)=0. The energy utilization is thus zero.

(2): From dawn (6 AM) to 7 AM; the solar station generates solar power with power supply capacity P(t2) <2.5*Pr (W), which is strong enough to maintain a running pump but not strong enough to start the pump Pr; Pr=Vr*Ir, where Vr and Ir are the voltage rating and current required to maintain the running pump. Notice that it typically takes >3 times of Ir (Is>3 Ir) to start a pump at its voltage rating. Thus, the station does not engage the pump as its load to consume the generated solar power. However, the module 1233C regulates the devices 1210, 1233A, and 1233B to store and save the available energy ~2 Pr (Whr) into energy reservoir; the energy utilization is ~2 Pr (Whr).

(3): From 7 AM to 8 AM, the solar station increases power generation with power supply capacity up to P(t3)~2.5*1.3 Pr=3.25 Pr (W), enough to start one pump; and then uses the stored energy to start another 2 pumps to reach 3 pumps running together. Notice that although the starting power for the pump is large, it only takes a few second to start a pump and let it run in its normal power rating. The additional energy consumption for starting up a pump is thus small in comparison with the long time running energy. Therefore, there is not a big energy draining from the reservoir from the two pumps' start-up. The pump energy utilization is 3 Pr; while storage left-over energy is 0.25 Pr. The total energy utilization is 3.25 Pr; with accumulated energy storage is ~2.25 Pr.

(4): From 8 AM to 10 AM, the solar station increases solar power generation with power supply capacity up to P(t4) ~2.5*2.9 Pr=7.25 Pr (W). This is strong enough to maintain the 3 running pumps and also to start up the last pump to reach 120 meters water head with four relaying staged pumping system all together. The station engaged 4 pumps as its loading to consume the generated solar 4 Pr power and store the available power 3.25 Pr in the period. The pump energy utilization is 2*4 Pr=8 Pr (Whr) and the stored left-over energy is 2*3.25 Pr=6.5 Pr (Whr). The total energy utilization is 14.5 Pr (Whr); with accumulated energy storage into the reservoir 1235 and 1233B is 8.75 Pr (Whr).

(5): From 10 AM to 12 AM, the solar station increases power generation with power supply capacity up to P(t5) ~2.5*3.7 Pr=9.25 Pr (W), which is strong enough to maintain the 4 pumps running and to store the left-over 5.25 Pr of power into the energy reservoir over two hours. The pump energy utilization is 2*4 Pr=8 Pr and energy storage utilization is 2*5.25 Pr=10.5 Pr. The total energy utilization is 18.5 Pr; also with accumulated energy of 19.25 Pr inside the reservoirs 1235 and 1233B.

(6): It happens that suddenly a heavy cloud covers part of the sky above and casting a shadow onto the solar panels at noon for ~30 minutes; referred to as the "shadow casting". The power supply capacity P(t6) plunges to below 2.5 Pr. This analysis ignores the generated solar power; demands the system to provide all the insufficient energy (0.5 hours with 4 Pr power) from the accumulated energy storage to sustain the pumps' loading; i.e., neglecting the solar power generated in these 30 minutes; and dictating the energy reservoir to provide the whole 4 pumps' power consumption in this period. The pump energy utilization is 0.5*4 Pr=2 Pr and the energy drained from the energy storage is also 2 Pr to balance the energy. The total energy utilization is 2 Pr; the accumulated energy stored is also reduced by 2 Pr, to 17.25 Pr.

(7): From 12:30 PM to 2 PM, the shadow gradually reduces its darkness to generate solar power with power supply capacity up to P(t7)~2.5*2.9 Pr=7.25 Pr, strong enough to maintain the 4 running pumps; and store 3.25 Pr left-over power for 1.5 hours. The station engages the 4 pumps as its load to consume the generated solar power; the pumps' energy utilization is 1.5*4 Pr=6 Pr. The storage energy utilization is 1.5*3.25 Pr=4.875 Pr. The total energy utilization is 10.875 Pr; the cumulative stored energy is increased to 22.125 Pr.

(8): From 2 PM to 4 PM, the sunlight is good enough to generate solar power with power supply capacity up to P(t8)~2.5*3.3 Pr=8.25 Pr, which is strong enough to keep the 4 pumps running and store 4.25 Pr power into the reservoir for 2 hours. The pumps' energy utilization is 2*4*Pr=8 Pr; and the storage energy utilization is 8.5 Pr. The total energy utilization is 16.5 Pr and with accumulated storage energy reaches 30.6255 Pr.

(9): After 4 PM till 5 PM, the solar station decreases solar power generation with power supply capacity P(t9)~2.5*2.3 Pr=5.75 Pr; enough to maintain the 4 running pumps; The station still engages the pump load and reservoir to consume and to store the generated solar power. The pumps' energy utilization is only 4 Pr; the reservoir's energy utilization is 1.75 Pr. The total energy utilization is 5.75 Pr; accumulated energy storage reaches 32.375 Pr.

(10): After 5 PM till 5:30 PM, the solar station decreases solar power generation with power supply capacity to P(t10) ~2.5*1.1 Pr=2.75 Pr, not enough to maintain the 4 running pumps; but the 1233C and 1233D regulate the reservoir to provide the insufficient power of 1.25 Pr for 30 minutes to keep the 4 pumps running in the period. The pumps' energy utilization is 0.5*4 Pr=2 Pr and the reservoir provides 0.5*1.25 Pr=0.625 Pr energy-outlet to comply with the energy conservation law. The total pumps' energy utilization is 2.75 Pr; and the accumulated storage energy is decreased to 31.75 Pr.

(11): After 5:30 PM till 6 PM, the sunlight is dim, the station solar power generation fluctuated up and down, with power supply capacity P(t11) also fluctuated at ~2.5*1.1 Pr or below Pr. This analysis ignores the solar energy production in this period, the reservoir provides all the needed energy to keep the 4 pumps running for the 30 minutes. The pumps' energy utilization is 0.5*4 Pr=2 Pr. The total pumps' energy utilization is 2 Pr; and the accumulated energy storage also reduced by 2 Pr; to 29.75 Pr.

(12): From 6 PM to 7 PM (the sunset); although the solar station still generate some power with power supply capacity to P(t12)<2.5 Pr. This analysis ignores this power production. The 4 pumps are kept running with the energy from the reservoir for more than 7 hours; starting from 6 PM into the evening of no sunlight, then, the pumps stop and wait for the next sun rise to provide the primary energy to the station. The 4 pumps' energy utilization is 29.75 Pr which depleted today's energy storage inside the reservoir completely.

The total energy utilization of the solar water pump station incorporating the principles described herein is the sum of the energy utilization in the 12 time stages; about 72.75*Pr for the whole day. The total available energy to be delivered is the sum of the power supply capacity in the 12 stages; about 75*Pr. Thus, the energy delivery efficiency of this solar water pump station incorporating this invention is 72.75 Pr divided by 75 Pr which is equal to 0.97, which is about 97%. With almost perfect energy extraction, the energy utilization efficiency and also the controller efficiency is ~97%, which is much better than that of the solar water pump station without incorporating the principles described herein, which is less than 10% evaluated previously. As the total amount of pumped water in the day, the pump incorporating the principles described herein is a factor of 72.75/5.5>13 of the conventional solar water pump station. What a difference!

Section Seven: The Summary

In lieu of using conventional "blind MPPT conformation practice", the principles described herein can decouple the energy production and extraction from the energy delivery and demand. On the one hand, the energy production and extraction may be optimized by operating the generator and the incorporated active/passive extractors 1210, 1233A, 1233B, and reservoir 1235 at a new voltage of maximum power extraction. In practice, this new voltage is very close to the MPPP voltage. Also, these new devices can actively/passively extract the surplus energy that is not picked up by the conventional extractor 1210; so as to reach almost 100% energy extraction from the generator's near-maximum power production; as described in Section Four.

On the other hand, the energy deliver to the demand is optimized by adding the new devices 1233C and 1233D to actively/passively combine the instantaneous energy extracted from the generator and the energy provided from the energy reservoir such that the energy preparation/delivery device can supply the right amount of energy in the correct specifications to exactly satisfy the demand power at the moment; as described in Section Six.

By doing so, the principles described herein can effectuate a practice that the energy systems can consistently operate at the MEUP to exploit the most of energy benefit from energy systems; especially from the green energy systems. When the subsystems are properly matched to optimize the efficiency in each step, the systems' energy utilization efficiency is typically measured to be improved to above 95%.

In summary: Firstly, the energy system described herein incorporates a surplus regulator, device 1230; specifically the modules 1233A and 1233B to work in conjunction with the energy reservoir 1235 to actively and passively pick up the surplus power generated that is not being extracted by the conventional power extractor 1210. By so doing, the fraction of energy extraction can be improved by more than a factor of 2; to almost perfectly extract all the produced power from the generator 1100.

Secondly, the principles described herein add energy adjustment regulator modules 1233C and 1233D to work with the energy reservoirs 1233B and 1235; such that the energy production/extraction process and the energy delivery/consumption process can be decoupled. Thus, the two processes can then be optimized separately.

Thirdly, the module 1233C is added to regulate the module 1233D to extract and to adjust the right amount of "needed" additional energy from the energy reservoir 1235 and 1233B actively and passively. This additional energy is combined with the instantaneous electricity extracted by the device 1210 directly from the 1100 to become a right amount of electric energy.

Fourthly, when this right amount of energy is delivered into the device 1220 (modules 1223 and 1225), the power is prepared and delivered to exactly satisfy the instantaneous load demand. The module 1223 is named as the "power preparation regulator"; and the module 1225 is named as the "power delivery regulator" herein.

The optimization procedure is: (A) to exercise fundamental electrical practice; one can design the active surplus extraction device 1233A and passive surplus extraction device 1233B, a Capacitive/Faraday device such that the generator 1100 can be operated in the vicinity of the MPPT voltage to produce near-maximum convert power and also to maximize the total power extraction as described in the Section Four. (B) The electric power produced is almost perfectly extracted by the conventional and the invented energy extractors 1210, 1233A, and 1233B actively and passively. (C) The invented device 1233C regulated the 1233D to extract and to adjust the right amount of "needed" additional energy from the energy reservoir 1235 and 1233B actively and passively. This additional energy is combined and prepared with the instantaneous electricity extracted by the 1210 directly from 1100 to become a right amount of electric energy. (D) The combined "right amount of electric energy" is sent into the device 1220 as input. This input energy went through modules of 1220, the module 1223 for preparation; such that when passed through the device 1225 to become the output from the 1220. (E) This output power is then delivered to near-exactly satisfy the instantaneous load demand of 1300. Thus, the principles described herein can theoretically maximize the energy utilization to approximately 100%.

In other words, the principles described herein operates the generator at the vicinity of MPPP voltage to produce near-maximum power; to incorporate the invented energy extraction devices to maximize the sum of extract all the power generated; to temporarily store the surplus energy into designed energy reservoirs; to add the invented devices to regulate and combine the energy from the extractor and from the reservoir to become a right amount of power as input, to be prepared/delivered to near-exactly satisfy the instantaneous load demand.

Thus, this invention can maximize the energy benefit from energy systems; especially those energy system using primary energy resources associate with time varying intensity, such as sunlight, wind, tides, and wave motion.

The present invention may be embodied in other specific forms without departing from its spirit or essential characteristics. The described embodiments are to be considered in all respects only as illustrative and not restrictive. The scope of the invention is, therefore, indicated by appended claims rather than by the forgoing description. All changes which come within the meaning and range of equivalency of the claims are to be embraced within their scope.

The invention claimed is:

1. An energy system comprising:
  a generator that converts a primary energy directly to DC electricity, the DC electricity being provided at an output of the generator;
  an energy reservoir;
  a power extractor that operates at an electric frequency to extract sinusoidal pulsating DC power from the generator and the energy reservoir and to convert the sinusoidal pulsating DC power into AC power; and
  a surplus power extractor that operates at the same electric frequency as the power extractor but with an approximately 90 degree phase difference in the electric frequency, the surplus power extractor being configured to extract a complementary sinusoidal pulsating DC power produced in the generator but not extracted by the power extractor and to temporarily store at least some of the complementary sinusoidal pulsating DC power into the energy reservoir, wherein an input of the surplus power extractor and an input of the power extractor are connected in parallel with each other to the output of the generator.

2. The energy system in accordance with claim 1, the electric frequency being variable in time.

3. The energy system in accordance with claim 1, a load demand of a load of the energy system being variable in time.

4. The energy system in accordance with claim 1, the power extractor also operating at an operating voltage.

5. The energy system in accordance with claim 4, the operating voltage being variable in time.

6. The energy system in accordance with claim 1, wherein, when the surplus power extractor extracts the complementary sinusoidal pulsating DC power produced in the generator, the surplus power extractor draws the at least some of the extracted complementary sinusoidal pulsating DC power into the energy reservoir at least when the extracted complementary sinusoidal pulsating DC power extracted by the power extractor exceeds a load requirement of a load on the energy system.

7. The energy system in accordance with claim 1, further comprising:
a power device that prepares, and delivers power from the energy reservoir to a load.

8. The energy system in accordance with 1, wherein a power device delivers power from the energy reservoir to satisfy a load demand of a load on the energy system when there is insufficient power extracted by the power extractor to satisfy the load demand.

9. The energy system in accordance with claim 8, the power device varying an amount of energy extracted from the energy reservoir so that the power device provides energy that at least approximately matches an instantaneously varying load demand of the load.

10. The energy system in accordance with claim 8, the power extractor being further designed to combine with the power device and the surplus power extractor into a combined device, the combined-power-extract-deliver device performing energy extraction and delivery functions.

11. The energy system in accordance with claim 1, the primary energy source being a variable energy source such that the generator generates a variable amount of electrical power.

12. The energy system in accordance with claim 1, the power extractor further comprising an extraction point tracker that tracks a time varying voltage of a maximum combined power extraction from the energy system by the power extractor and by the surplus power extractor and operates the energy system at this maximum power extraction point voltage.

13. The energy system in accordance with claim 1, the surplus power extractor extracting some surplus energy to increase energy provided to a power grid.

14. The energy system in accordance with claim 1, the surplus power extractor further comprising a surplus regulator that is coupled to an adjustable extraction device that operates at the same electric frequency as the power extractor to extract surplus electric power either resulting from the primary source but not extracted by the power extractor, and/or resulting from a power extraction exceeding a load demand.

15. The energy system in accordance with claim 14, the adjustable extraction device being an active device that operates at the same electric frequency as the power extractor and that locks-on-to the power extractor with an approximate ninety degree phase shift in the electric frequency such that the adjustable extraction device extracts up to a complementary amount of power as the surplus electric power.

16. The energy system in accordance with claim 14, the adjustable extraction device being a combined active device that consists of a plurality active devices and that operates at the same electric frequency as the power extractor, and wherein the plurality of active devices collectively extract up to a complementary amount of power as the surplus electric power.

17. The energy system in accordance with claim 14, the adjustable extraction device being a passive device that has an approximately ninety degree phase shift in the electric frequency from the power extractor to extract up to a complementary amount of power as the surplus electric power.

18. The energy system in accordance with claim 17, the passive adjustable extraction device being a capacitive/faraday device that has a large enough capacitance to make the passive adjustable extraction device have an approximately ninety degree phase shift in the electric frequency from the power extractor to extract up to a complementary amount of power as the surplus electric power.

19. The energy system in accordance with claim 14, the adjustable extraction device being a combined active and passive device such that the combined active and passive device collectively extracts the surplus electric power up to a complementary amount of power as the surplus electric power.

20. The energy system in accordance with claim 1, the power extractor and the surplus power extractor being combined into a combined-extractor to perform both energy extraction functions, the energy reservoir being further designed to combine with the power extractor to become a combined power extractor-reservoir device to perform both energy extraction and energy storage functions.

* * * * *